Dec. 16, 1930.  N. FELIZIANETTI  1,785,011
FRUIT PITTING MACHINE
Original Filed May 13, 1922  3 Sheets-Sheet 2

Inventor
NARSETE FELIZIANETTI
Lyon & Lyon
Attorneys

Dec. 16, 1930.  N. FELIZIANETTI  1,785,011
FRUIT PITTING MACHINE
Original Filed May 13, 1922  3 Sheets-Sheet 3

Inventor
NARSETE FELIZIANETTI
Lyon & Lyon
Attorneys

Patented Dec. 16, 1930

1,785,011

UNITED STATES PATENT OFFICE

NARSETE FELIZIANETTI, OF LOS ANGELES, CALIFORNIA, ASSIGNOR, BY MESNE ASSIGNMENTS, TO PACIFIC MACHINERY COMPANY, OF SAN FRANCISCO, CALIFORNIA, A CORPORATION OF CALIFORNIA

FRUIT-PITTING MACHINE

Application filed May 13, 1922, Serial No. 560,750. Renewed March 31, 1926.

This invention relates to a fruit pitting machine.

It is the principal object of the present invention to provide a machine adapted for performing a pitting operation upon drupaceous fruit by an automatic mechanism, said mechanism being direct in its action, continuous in operation, and adapted to eliminate the pit from the pulp of the fruit in a desirable manner without the aid of any manual operation, other than that required to place the fruit within the machine.

The present invention contemplates the use of a continuous moving table carrying a plurality of clamping elements between which articles of fruit may be grasped, said table successively presenting the fruit to the action of a splitting member, a pit removing member, and an ejector.

Another object of this invention is to provide means for cutting and halving drupaceous fruit, which means include means for cutting the fruit, engaging means adapted to contact the cut surfaces of the pulp of the fruit and pitting means mounted within the engaging means and adapted to pass around the pit to cut the pit free from the pulp, which pitting means are yieldable relative to the engaging means so as to permit the pitting means to conform to the contour of the pit so as to cut the pit from the fruit without removing from the fruit a large portion of the flesh thereof.

Another object of this invention is to provide pitting means adapted to cut the pit from the flesh of the fruit, and which pitting means are yieldable relative to the engaging means for the fruit and so operated as to permit the cutting of the pit from the fruit while closely conforming to the curvature of the pit, and which pitting means are so operated and constructed as to enable the same to cut around the pit without danger of the same catching upon the fin of a pit.

Another object of this invention is to provide a machine for halving and pitting fruit, which machine includes means for cutting the fruit to gain access to the pit, means for engaging the cut fruit and receivable in the cut of the fruit to embrace the cut surfaces of the pulp or flesh of the fruit, and a pair of rotatable pitting members or knives arcuate in form mounted in the engaging means so as to reach beyond the surface of the support and cut the pit from the flesh or pulp of the fruit.

Another object of this invention is to provide a machine for halving and pitting fruit, which machine includes means for cutting the flesh of the fruit and a pair of cutting elements or knives rotatably mounted in means for engaging the cut fruit, and which knives are adapted to be rotated in the same direction through substantially 180° to cut the pit free from the flesh or pulp of the fruit.

The invention is illustrated by way of example in the accompanying drawings in which.

Figure 1:
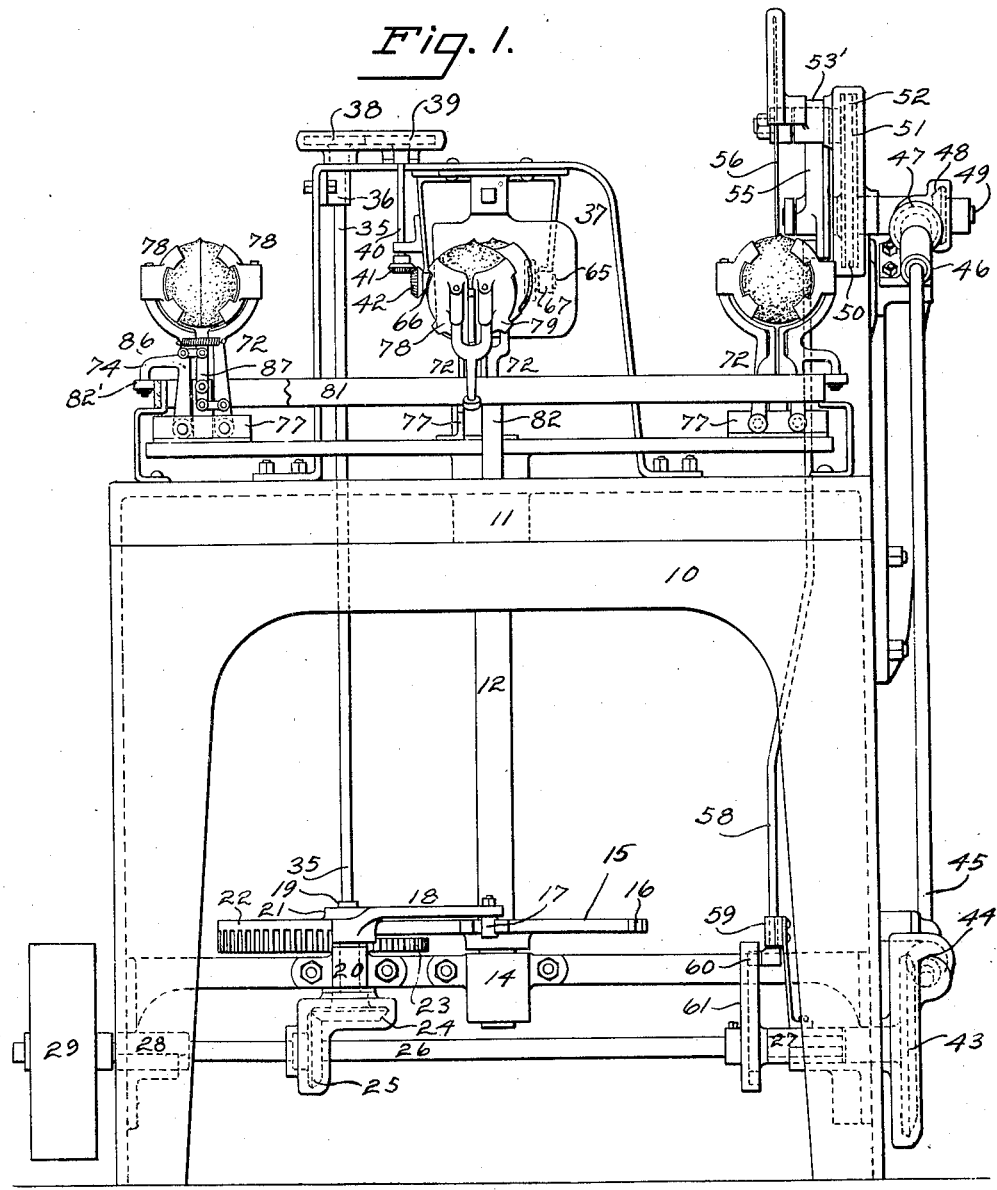
Figure 1 is a view in side elevation showing the present invention as assembled for operation.
Figure 2:
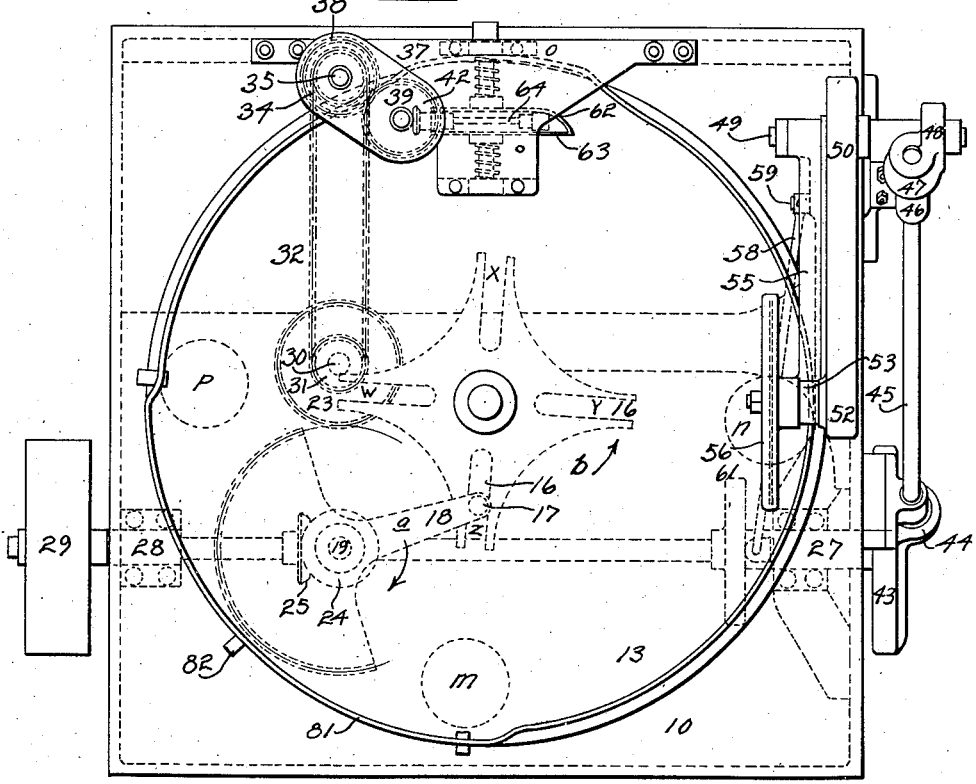
Fig. 2 is a view in plan showing the revolving table and further indicating the driving mechanism of the invention.

Referring more particularly to the drawings 10 indicates a sub-frame having a horizontal table portion and a plurality of supporting legs. The table portion is formed with a central bearing 11 through which a vertical drive shaft 12 is rotatively secured. On the upper end of this drive shaft is a turntable with which it rotates. The lower end of the drive shaft is supported within a suitable bearing 14, near which a Geneva movement 15 is secured. This movement, as will be understood, is provided for causing intermittent rotation of the shaft 12 at successive intervals. As shown in Fig. 2 the movement is designed to produce four partial rotations and is therefore equipped with radial slots 16. A pin 17 is adapted to intermittently engage those slots and is carried upon a timing arm 18. This arm is fixed upon a timing shaft 19 extending parallel with the main shaft 12 and housed in a lower bearing 20 and an upper bearing 21. The arm 18 is formed integral with a gear segment 22, which segment is adapted to mesh with a gear 23 during a portion of its revolution and to operate other mechanism which will be hereinafter described. The timing shaft 19 is driven through beveled gears 24 and 25. The beveled gear 24 is fixed to the lower end of the timing shaft while the beveled gear 25 is fastened upon a horizontally extending transmission shaft 26. This shaft is rotatively supported at points near its opposite ends within bearings 27 and 28. The shaft is driven by a suitable pulley 29 and thus provides the necessary power for all of the mechanism embodied within the present invention.

The gear 23 is mounted upon a shaft 30 standing vertically and fitted with a sprocket wheel 31 and a sprocket chain 32 passes around this wheel and also around a sprocket wheel 34. This last named wheel is fixed upon a vertically extending shaft 35, the upper end of which terminates above the turn table and is supported within a bearing 36 carried by a frame 37; fixed upon the upper end of the shaft 34 is a gear 38 in constant mesh with a spur gear 39. The spur gear is mounted upon a short shaft 40, carrying a beveled gear 41 at its lower end, this beveled gear is in constant mesh with a second beveled gear 42, for a purpose to be hereinafter disclosed.

The end of the transmission shaft 26 opposite from the pulley 29 is fitted with a large beveled gear 43. This gear is in constant mesh with a small beveled pinion 44 carried upon the lower end of an inclined drive shaft 45. The upper end of the drive shaft 45 is housed within a bearing 46 upon the subframe and is further fitted with a beveled gear 47 in mesh with a gear 48. The gear 48 is mounted upon a horizontal shaft 49 with which it rotates. This shaft 49 is equipped with a sprocket 50 carrying a sprocket chain 51 which chain also embraces a second sprocket 52. The sprocket 52 is mounted upon a mandrel 53' rotatively supported at the outer end of a radius frame 55. This frame is mounted to swing vertically around the shaft 49 and to carry the mandrel 53'. The mandrel is fitted with a saw 56 for performing a splitting operation upon the fruit to be pitted.

The vertical swinging of the radius frame 55 with the cutting member 56 is produced by a push rod 58 which extends through sliding bearings 59 and which is fitted at its lower end with an operating pin 60. This pin travels in an eccentric face groove upon a cam 61. The cam is fixed to rotate with the transmission shaft 26. The upper end of the push rod is pivotally connected to the radius frame and will oscillate this frame when the rod is reciprocated by the rotation of the cam 61.

As before stated, the saw 56 is provided to split the fruit and its pit and it is thereafter necessary to separate the halves of the pit from the halves of the fruit. This is done by providing a pair of separating blades 62 and 63 which are curved at their forward ends to form a penetrating point and which for the most part are separated from each other to accommodate pitting knives 64. The knives 64 are semi-circular in shape and are mounted to rotate upon a shaft 65 which is supported from hanging bearings 66 and 67. This shaft carries the beveled gear 42 previously mentioned and derives its power therefrom. As more clearly shown in Fig. 3 the blades 62 and 63 are formed with circular openings 68, through which the knives 64 may rotate to engage the fruit and pass around the pit. These blades are yieldably held by springs 69 which circumscribe squared shanks 70, one of which is rigidly secured to each of the blades. The shanks extend through squared openings in bearings 71 carried upon the frame structure 37.

The knives 64 provide means for severing the pit from the flesh or pulp of the fruit and are curved so as to conform with the curvature of the pit of the fruit. The blades 62 and 63 are yieldingly supported by means of springs 69 as heretofore described to permit relative yielding between the pitting knives 64 and blades 62 and 63. This relative yielding of the blades 62 and 63 to the knives 64 enables the knives 64 to closely follow the curvature of the pit and cut the same from the flesh of the fruit. The knives 64 are rotated in the same direction and through substantially 180 degrees so that the knives will not be carried over the fin of the pit so as to tend to catch upon such a fin.

Figure 4:
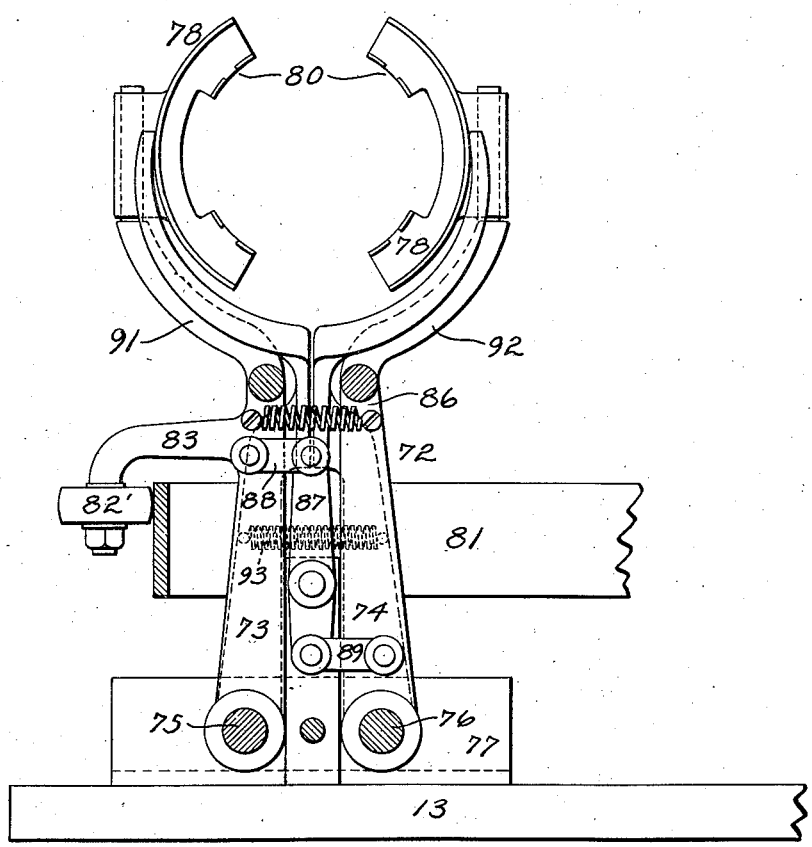
Fig. 4 is an enlarged view in section and elevation showing one of the gripping units carried by the table.

The turn table 13 carries a plurality of gripping units 72. In the present instance, four of these units are utilized and are placed upon the turn table in positions at 90 degrees from each other. One of these units is shown in detail in Fig. 4 where it will be seen to comprise a pair of vertically swinging arms 73 and 74 which are mounted upon pivots 75 and 76 respectively. These pivots are fixed upon a pivot block 77 rigidly secured to the upper face of the turn table. The upper ends of these arms are forked and carry jaw members 78—78. These jaws are pivoted to the separate forks of the arms and are intended to be brought to embrace the fruit to be operated upon. Each of the jaws is formed with clamp portions having inturned teeth 80 adapted to be projected through the surface of the fruit and to hold the fruit against rotation. The arms 73 and 74 are adapted to be moved toward or away from each other by a positive operation. In the drawings it will be seen that track cam 81 is provided, this cam extends around and over the turn table and is supported by brackets 82. The swells on the cam are designed to agree with operating stations disposed at 90 degrees to each other around the frame. A roller 82 is carried by an arm 83 on each of the units. This roller is held in constant engagement with the outer face of the track by means of a tension spring 86. The arm 83 is formed integral with the swinging arm 73 and is adapted to simultaneous movement with the arm 74 through a lever 87 fitted at its upper end with a link 88 secured to the arm 73 and at its lower end with the link 89, secured to the arm 74. It will thus be evident that any oscillation of the forked arm 73 will be imparted to the arm 74 to move it in an opposite direction and to thus cause the two arms 73 and 74 to recede from each other at equal speeds.

It is evident that when the forked arms 73 and 74 of the gripping units are forced toward each other when an article of fruit has been placed between them that the jaws 78 and 79 will tend to embrace the fruit. This is accentuated due to the fact that there is a space between the pivots of the jaws where an edge of each jaw overhangs and this edge will be first to bear against the fruit and as pressure is exerted upon it will act to swing the outer edges around to more firmly clamp the fruit. At certain points in the operation of the present invention it is necessary to release these jaws and for that reason trip fingers 91 and 92 are provided. These fingers extend up between the forks of the arms 73 and 74 and may be brought to rest against the inner portions of the jaws. Movement of the clips toward each other is prevented by causing them to abut against each other when a predetermined point has been reached. These fingers are carried upon downwardly extending arms pivoted upon the pivot pins 75 and 76. The downwardly extending portions of the fingers are equipped with tension springs 93, which tend to hold them in their innermost positions.

Figure 3:
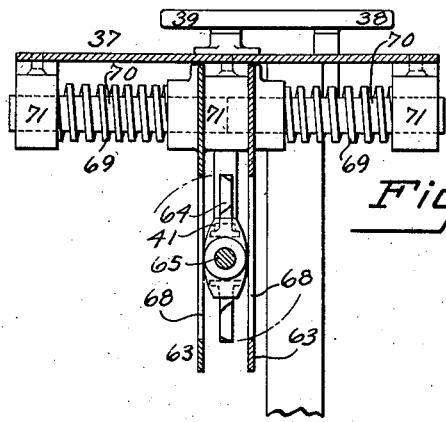
Fig. 3 is a view in section through the pitting mechanism used at the second station in the operation of the machine.

As will be apparent from Figure 3, the pitting knives 64 are beveled outwardly so that the cutting edges of the knives 64 lie upon the perimeter of the circle described by the rotation of the knives 64 and the inner edge of the beveled knives 64 will function to keep the cutting edges of the knives 64 spaced from the pit of the fruit. The holding of the cutting edges spaced from the pit of the fruit will eliminate the danger of the cutting edges snagging upon projections of the pit, and will also cause the pitting knives 64 to operate so as to cut a shallow, or thin, film of fruit pulp from the halves of the fruit, thereby affording a thin film of fruit which adheres to the pit.

In the operation of the present invention the machine is assembled as shown in the drawings and power is delivered thereto from a suitable source of supply through the drive pulley 29. This will produce rotation of the transmission shaft 26 and will simultaneously drive beveled gear 25, cam 61, and the large beveled gear 43; the beveled gear 25 being in constant mesh with the gear 24 will cause continuous rotation of the shaft 19. This will, of course, cause a continuous movement of the segment gear 22 and the trip arm 18 formed integral therein. Assuming that the arm moves in the direction of the arrow $a$, it will be seen that the pin 17 will pass into the slot $w$ of the Geneva movement cam 15, other of the slots 16 will be indicated as $x$, $y$, and $z$, for the sake of clearness and it will be evident that these radial slots will stand at 90 degrees to each other. In the present machine as the arm 18 moves in the direction of the arrow $a$ the cam 15 will rotate in the direction of the arrow $b$, and this will cause the table to intermittently rotate and bring the gripping unit 72 into successive operating positions at a feed station $m$, a splitting station $n$, a fruit pitting station $o$, and an ejecting station $p$. The swell of the cam track 81 between stations $p$ and $m$ will cause the arms 73 and 74 of the unit passing therealong to be separated at some point during this length of travel. The article of fruit to be pitted is inserted between the jaws and when the unit passes station $m$ the cam track 81 recedes so that the pressure upon roller 82 will be relieved and spring 86 will be permitted to draw the arms 73 and 74 together, carrying the clamping jaws 78 and 79 around the fruit. The central projecting edges of the clamping jaws will first penetrate the spherical contour of the fruit and as the arms 73 and 74 swing against the fruit will cause the jaws to conform to the contour and grip the fruit. The teeth 80 will then penetrate the surface of the fruit and hold it against rotation; the unit will then travel from station $m$ to $n$ at which point the intermittent cam 15 will cause the unit to stop, and in synchronism with this movement cam 61 will act to draw down upon the rod 58 and thus cause the radius frame 55 to swing forward due to the fact that the saw 56 is in continuous rotation. The fruit will be rapidly split into two halves along a vertical plane, the unit will then pass from station $n$ toward the station $o$ where the cam track 81 will cause the jaws 78 and 79 to be relieved, and will permit the blades 62 and 63 to force their way between the severed halves of the fruit. At station $o$ the unit will stop and the semi-circular pitting knives 64 will then rotate through the openings 68 in the blades 62 and 63 and will tend to separate the pulp from the pit of the fruit. It will be understood that the pit knives 64 are intermittently driven by means of the segmental gear 22 coming into mesh with the gear 23 and thereby setting into motion the gear and sprocket train leading to the shaft 35. After the pitting operation has been completed, intermittent movement of the table is again effected to carry the unit from station o to station p, at the same time causing the jaws to be contracted around the fruit again. As station p is being reached an abrupt swell in the track 81 will be encountered and this will cause the jaws to be rapidly thrown apart and the pitted halves of the fruit ejected therefrom by the violence of the action. The unit is then clear and is ready to receive another article of fruit, it being understood that the other units are following the same cycle of operation at each quarter of a revolution of the turntable.

It will thus be seen that the present invention provides continuous-operating means for automatically halving and pitting fruit and that it is insured that the pit will be completely removed from the pulp of the fruit by the positively acting fruit splitting means and the pitting members.

It will be obvious from the foregoing description that the blades 62 and 63 provide means adapted to engage or contact the cut surfaces of the pulp or flesh of the fruit, and that the pitting means (pitting knives 64) being mounted within the said flesh engaging means, operate to pass around the pit of the fruit to cut the pit from the pulp. Through the springs 69, a relative yielding is automatically accomplished between said pitting knives 64 and engaging means 62 and 63, so that the said pitting knives 64 will follow closely the curvature of pits of varying sizes and shapes and sever the same from the flesh without removing with the pits any material portion of the flesh or pulp of the fruit. There being two of such knives 64 spaced 180° on the shaft 65, the pit of the fruit will be severed from the pulp of the fruit by rotating the shaft through 180° and it will not be necessary to rotate or return the shaft 65 back to the starting position before repeating the pitting operation. The provision of the two knives on the single shaft greatly simplifies the construction of the driving mechanism required for the operation of the pitting means.

While I have shown the preferred form of my invention as now known to me, it will be understood that various changes might be made by those skilled in the art without departing from the spirit of the invention as claimed.

I claim:

1. A fruit pitting machine having a horizontally revoluble turntable, gripping means disposed on the upper surface thereof for holding articles of fruit, a fruit splitting member disposed along the path of travel of said turntable; a fruit pitting member disposed along the path of travel of the turntable, and driving mechanism adapted to intermittently operate the turntable and position it in operative position relative to the splitting means.

2. A fruit pitting machine comprising a sub-frame, a horizontally moving turntable rotatable thereon, a plurality of fruit gripping units disposed around the upper surface of said turntable, means for opening and closing said gripping units at various stations in the rotation of said turntable, fruit splitting means disposed at one station in the rotation of the turntable, fruit pitting means disposed at a succeeding point in the rotation of said turntable and timing means for intermittently operating all of said mechanism in synchronism.

3. A fruit pitting machine comprising a frame, a horizontally rotating turntable thereon, a plurality of gripping units disposed at equal intervals around the turntable, and carried thereby, a track circumscribing the turntable and adapted to open and close the gripping units at certain positions in their travel, splitting means disposed at one point in the path of travel of the units and adapted to halve an article of fruit carried by a unit, pitting means disposed at a succeeding point in the travel of said unit for separating the pit from the fruit, and a driving mechanism adapted to intermittently move the turntable and actuate the splitting and pitting mechanism in synchronism.

4. In a fruit pitting mechanism, a gripping unit comprising a pair of forked arms, a pair of clamping jaws pivoted upon each of said arms, and adapted to cooperate with the jaws on the complementary arm to hold an article of fruit, and means simultaneously swinging the arms with their jaws toward and away from each other.

5. In a fruit pitting mechanism, a gripping unit comprising a pair of forked arms, a pair of clamping jaws pivoted upon each of said arms, and adapted to cooperate with the jaws on the complementary arm to hold an article of fruit, means simultaneously swinging the arms with their jaws toward and away from each other, and yieldable means for swinging the jaws when the forks are moved outwardly.

6. In a fruit pitting machine a gripping unit, a saw normally positioned out of the path of travel of said unit for splitting an article of fruit carried by said unit and means operating in timed relation with the gripping means for disposing the fruit in operating relation to said saw and thereafter feeding the saw through the fruit.

7. In a fruit pitting machine, a gripping unit, a traveling carrier therefor, means to halve fruit in the gripping unit, a pair of apertured plates adapted to be forced between the halves of the fruit as the unit moves and a rotary pitting member located between the plates and adapted to circumscribe the pit of the fruit and free it from the pulp.

8. A fruit pitting machine comprising a main frame, a horizontally rotatable turntable thereon, a plurality of fruit gripping units disposed around and carried upon said turntable, a cam track adapted to open and close the gripping units at various stations around the turntable, a splitting unit carrying a saw and disposed at one station along the track to halve fruit carried in the gripping units, a pitting unit having a rotary cutter adapted to circumscribe the pit of the fruit and separate it from the pulp, said unit disposed at a second station along the track and driving mechanism for said various units and the turntable operating intermittently and in synchronism to successively cause the fruit to be gripped, then delivered to the splitting unit, thereafter delivered to the pitting unit and then ejected from the gripping units.

9. A fruit pitting machine comprising a rotary turntable, fruit receiving members disposed around the circumference of said turntable, a fruit splitting mechanism in the path of travel of the fruit receiving members, and a fruit pitting mechanism in the path of travel of said fruit receiving mechanism, said turntable being adapted to successively deliver the fruit to the splitting and pitting mechanisms as it rotates.

10. In a machine for removing stones from fruit, devices traveling in a rotary path for receiving and holding fruit, means for halving the fruit while held in said devices, means for separating said devices, a curved knife, and means for imparting motion to the said knife to remove the core or stone from said fruit.

11. In a machine for removing stones from fruit, devices traveling in a rotary path for engaging and holding the fruit, means for halving the fruit while held by the said devices, a V-shaped director having walls for separating the said fruit holding devices and maintaining the same in spaced positions, a curved knife adapted to operate in an opening provided in a wall of the said director, and means for actuating the said knife to remove the core or stone from the fruit.

12. In a fruit pitting device, a pair of complementary curved pitting knives mounted upon a single shaft and having their cutting portions arranged on substantially diametrically opposite sides of the shaft, and means providing surfaces with which the flesh of the fruit engages and having an opening through which the knives operate to simultaneously completely sever the pit from the fruit.

13. In a pitting device, a pair of complementary curved pitting knives mounted upon a single shaft and having their cutting portions arranged on substantially diametrically opposite sides of said shaft, means adapted to be engaged with the cut surfaces of a fruit and having an opening formed therein within which said pitting knives operate, and means for effecting relative rotation between the pitting knives and said fruit engaging means.

14. In a pitting device, the combination of means for cutting the flesh of a fruit, a pair of complementary curved pitting knives having their cutting portions arranged on substantially diametrically opposite sides of a common center of rotation, means for rotating the pitting knives in the same direction, a blade adapted to engage the cut surfaces of the flesh of the fruit and having an opening formed therein in which said pitting knives operate.

15. In a pitting device, the combination of means for cutting the flesh of the fruit, a blade adapted to be engaged with the cut surface of the fruit and having an opening formed therein, a pair of complementary curved pitting knives mounted in said opening and having their cutting portions arranged on substantially diametrically opposite sides of a common center of rotation, and means for relatively yieldably supporting the said pitting knives and blade.

16. In a fruit pitting device comprising means for cutting the fruit to gain access to the pit, a blade receivable in the said cut, a pair of complementary rotatable curved pitting knives mounted on substantially diametrically opposite sides of a common center of rotation in an opening formed in said blade, and means for rotating said knives in the same direction to pass simultaneously around opposite sides of the fruit pit.

17. A fruit pitting device comprising means for cutting the fruit to gain access to the pit, a pair of complementary curved pitting knives having their cutting portions arranged on diametrically opposite sides of a common center of rotation and receivable in the line of the cut formed in the fruit, and means for rotating the said knives to pass simultaneously around opposite sides of the fruit pit.

18. In a fruit pitting machine in which the flesh of the fruit is first split so as to form two sections of the fruit flesh, means having an opening and arranged for contacting the fruit sections against opposite surfaces of said means and with the pit alined with the opening thereof, a pair of complementary curved knives arranged on substantially diametrically opposite sides of a common center of rotation to be simultaneously rotated from said opening to pass simultaneously around opposite sides of the fruit pit.

19. A fruit pitting machine in which the flesh of the fruit is first cut so as to form two halves or sections upon the removal of the pit, said machine including a pair of complementary curved knives having their cutting portions arranged on diametrically opposite sides of a common center of rotation, fruit engaging means having an opening within which said knives operate, the cut surfaces of the fruit sections bearing about said opening against substantially parallel surfaces of said fruit engaging means.

20. In a fruit pitting machine, the combination of fruit flesh severing means to halve the flesh of the fruit, means including a curved knife rotative about the axis of the fruit pit for pitting the fruit, and a revolving member for directly presenting the fruit to the severing means and pitting means successively.

21. A machine for removing pits from fruit including means for halving the fruit, means for holding the two halved parts in spaced relation, a shaft, said shaft having cutting means thereon, said cutting means being positioned to simultaneously remove the pit from both halves of the fruit.

22. A pit remover for a fruit pitting machine, said pit remover including a shaft having a knife mounted on opposite sides thereof, means to turn said shaft, and means to hold halved portions of fruit in the path of said knife.

23. In a fruit pitter, the combination of an intermittently rotating turret, means for clamping a halved fruit against an orificed surface, and means for removing the halved pit while the fruit is so clamped.

24. In a fruit pitter, the combination of an intermittently rotating turret, means for supporting a half of a fruit against an orificed surface, and means operative while the turret is at rest for removing the half pit from the fruit so held.

25. In a fruit pitter, the combination of an intermittently rotating turret, means for halving a fruit and the pit thereof, means for supporting a half of a fruit against a surface over an orifice, and a curved pitting means for removing the half pit while the turret is at rest.

26. In a fruit pitter, the combination of an intermittently rotating turret, means for sawing a fruit in half through the pit, means for clamping a half pit on a surface over an orifice formed therethrough, and means for removing the half pit while the turret is at rest.

27. In a fruit pitter, the combination of an intermittently rotating turret, means for sawing a fruit in half through the pit, means for clamping a half pit on a surface over an orifice formed therethrough, and a curved pitting means adapted to operate through the orifice and remove the half pit.

28. In a fruit pitter, the combination of an intermittent horizontal rotating turret, gripping means mounted thereon, a saw adapted by its movement in the plane of the pit suture to pass through and completely sever the flesh of the fruit and the pit, and pitting means comprising a pair of knives to simultaneously pass around and sever the halved portions of pit from the fruit halves.

29. A fruit pitting apparatus including a pitting knife curved to partly embrace the pit of a fruit and provided with a part adapted to maintain the cutting edge spaced from the pit to afford a thin film of fruit adhering to the pit during the cutting operation.

30. A fruit pitting apparatus including a pitting knife curved to partly embrace the pit of a fruit and provided with a part adapted to maintain the cutting edge spaced from the pit to afford a thin film of fruit adhering to the pit during the cutting operation, and means for moving the knife about the pit on an axis in substantial alignment with the greatest diameter of the pit.

31. In a fruit pitting device, an arcuate pit removing knife having a curvature approximately similar to that of the exterior of the pit and having a raised portion adapted to engage the pit of the fruit, and to hold the cutting edge of the knife away from the pit.

32. A peach pitting knife comprising a holder, two blades secured to the holder, each blade being angularly separated from the other by substantially 180°, and curved to approximate the contour of a half peach pit.

33. A peach pitting knife comprising a holder, two cutting blades carried by said holder, said cutting blades being shaped to form a loop between them that is designed to surround the pit.

34. A peach pitting knife including a pair of cutters forming a loop between them, each cutter being provided with a cutting edge at one side, the cutting edges being so arranged that upon rotation of the knife both halves of a peach may be simultaneously cut from the pit.

35. A peach pitting knife in the form of a loop approximating the outline of a pit, the cutting edge of one-half of the loop being at one side of the loop and the cutting edge of the other half of the loop being on the other side thereof.

36. A peach pitting and halving machine, comprising means to feed the fruit in succession to several stations, means at one station to halve the fruit, and means at another station to simultaneously cut both halves of the fruit from the pit.

37. In a pitting device, a pair of complementary curved pitting knives mounted upon a single shaft, and means providing surfaces with which the flesh of the fruit engages and having an opening through which the knives operate to simultaneously completely sever the pit from the fruit.

38. In a pitting device, a pair of complementary curved pitting knives mounted upon a single shaft, means adapted to engage with the cut surfaces of the fruit and having a pitting knife receiving opening formed therein, and means for effecting relative rotation between the pitting knife and said engaging means.

39. The method of pitting a peach which comprises halving the peach to expose the pit, and simultaneously cutting the halves from the pit by cuts that begin and end at the edges of the pit.

40. A peach pitting and halving machine comprising means to halve the fruit and the pit thereof, and means to then simultaneously cut both halves of the fruit from the pit.

41. A peach pitting and halving means, comprising means to halve the fruit, and means to then simultaneously cut both halves of the fruit from the pit, said last named means comprising a pair of curved knives.

42 In a pitting device, the combination of means for cutting the flesh of the fruit, a pair of complementary curved pitting knives, means for rotating the pitting knives in the same direction, a blade adapted to engage the cut surfaces of the flesh of the fruit, said blade having a pitting knife receiving opening formed therein in which the said knives are operated.

43. In a fruit pitting device comprising means for cutting the fruit to gain access to the pit, a blade receivable in said cut, a pair of complementary rotatable curved pitting knives mounted in an opening formed in the said blade, and means for rotating the said knives in the same direction for severing the pit from the flesh of the fruit.

44. A fruit pitting device comprising means for cutting the fruit to gain access to the pit, a pair of complementary curved pitting knives rotatable on a common center and receivable in the line of said cut, and means for rotating the said knives to sever the pit from the flesh of the fruit.

45. In a fruit pitting machine in which the flesh of the fruit is first split so as to form two sections of fruit flesh, means having an opening, arranged for contacting the fruit sections, with their edges bearing against the outer surfaces of said means and with the pit aligning with the opening thereof, a pair of complementary curved knives mounted to be simultaneously actuated through said opening about the pit, and remove the same from said sections.

46. A fruit pitting machine in which the flesh of the fruit is first cut so as to form two halves, said machine including a pair of curved knives, fruit engaging means having an opening within which said knives operate, the cut surfaces of the fruit sections bearing against the surface of said fruit, engaging means about said opening, said knives operating through said opening to simultaneously completely remove the pit from the fruit sections.

47. The method of pitting a peach which comprises halving the peach and the pit thereof, and severing the halves from the pit by simultaneously cutting them from the pit.

48. A peach pitting and halving machine including means to halve a peach, means to contact the cut surface of the flesh of the peach, and a pair of members adapted to pass simultaneously on both sides of the pit to sever the fruit from the pit.

49. In a peach pitting and halving machine, means to contact a cut surface of the flesh of the peach and to support the peach, and a pair of members adapted to pass simultaneously on opposite sides of the pit to sever the pit from the flesh of the fruit.

50. A peach pitting and halving device including means for halving the flesh of the peach, means for supporting the peach, a pair of pitting members, means for actuating the pitting members to simultaneously pass the pitting members on opposite sides of the pit of the peach to free the halves of the peach from the pit.

51. A fruit pitting and halving device including means for halving the flesh of the peach, a pair of pitting members, and means to simultaneously actuate the pitting members to pass the same on opposed sides of the fruit pit and to free the halves of the peach.

52. In a pitting device, means for severing the flesh of the fruit from the pit, consisting of a pair of rotary cutters, and means for rotating the cutters about the pit of the fruit.

53. In a device of the class described, the combination of a rotating turret having cutting and pitting stations, means at one station to cut a fruit and the pit thereof into halves, means for holding fruit halves against an orificed surface at a second station, and means for simultaneously removing the halves of the pit while the fruit is so held.

54. In a fruit pitter, the combination of an intermittently rotating turret upon which a fruit is adapted to be supported, means for clamping a halved fruit against an orificed surface while the fruit is supported on the turret, and means for simultaneously removing the halved pit while the fruit is so clamped and while the turret is at rest.

55. The method of pitting a peach which comprises halving the peach and then simultaneously cutting the halves from the pit by cuts made on opposite sides of the pit approximating the contour of the pit.

56. The method of pitting a peach which comprises halving the peach and then simultaneously cutting the halves of the peach from the pit by cuts made in the same direction on opposite sides of the pit approximating the contour of the pit.

57. In a fruit pitting device the combination of means for cutting the flesh of the fruit, means providing surfaces adapted to contact the cut surfaces of the pulp of the fruit, curved pitting means mounted within said contacting means, means for rotating the pitting means around the pit to sever the same from the flesh of the fruit, and automatically laterally yielding means for supporting the pitting means and said contacting means so as to permit relative yielding between the said pitting means and the said contacting means.

58. A peach pitting and halving machine comprising means to halve the fruit and means mounted for rotation about an axis passing approximately through the center of the peach to simultaneously cut both halves of the fruit from the pit.

59. A peach pitting and halving machine comprising means to halve the fruit and means mounted for rotation about an axis passing approximately through the center of the peach to simultaneously cut both halves of the fruit from the pit, said last named means comprising a pair of curved knives.

60. A peach pitting and halving machine comprising means to feed the fruit in succession to several stations, means at one station to halve the fruit and means at another station to simultaneously separately cut both halves of the fruit from the pit.

61. A peach pitting knife including a pair of cutters forming a loop between them, each cutter being provided with a cutting edge at one side, the cutting edges being so arranged that upon rotation of the knife both halves of the peach may be simultaneously cut from the pit.

62. A peach pitting knife in the form of a loop approximating the outline of a pit, the cutting edge of one-half of the loop facing in one direction and the cutting edge of the other half of the loop facing in the opposite direction.

63. The method of pitting a peach which consists in exposing the edge of the pit and cutting the fruit from the pit by cuts made simultaneously on opposite sides of the pit and that begin and end at said exposed edge.

Signed at California this 5th day of May, 1922.

NARSETE FELIZIANETTI.